Aug. 19, 1958    P. JOHNSON    2,847,827
HYDRAULIC COMPENSATING MASTER CYLINDER
Filed Sept. 13, 1954
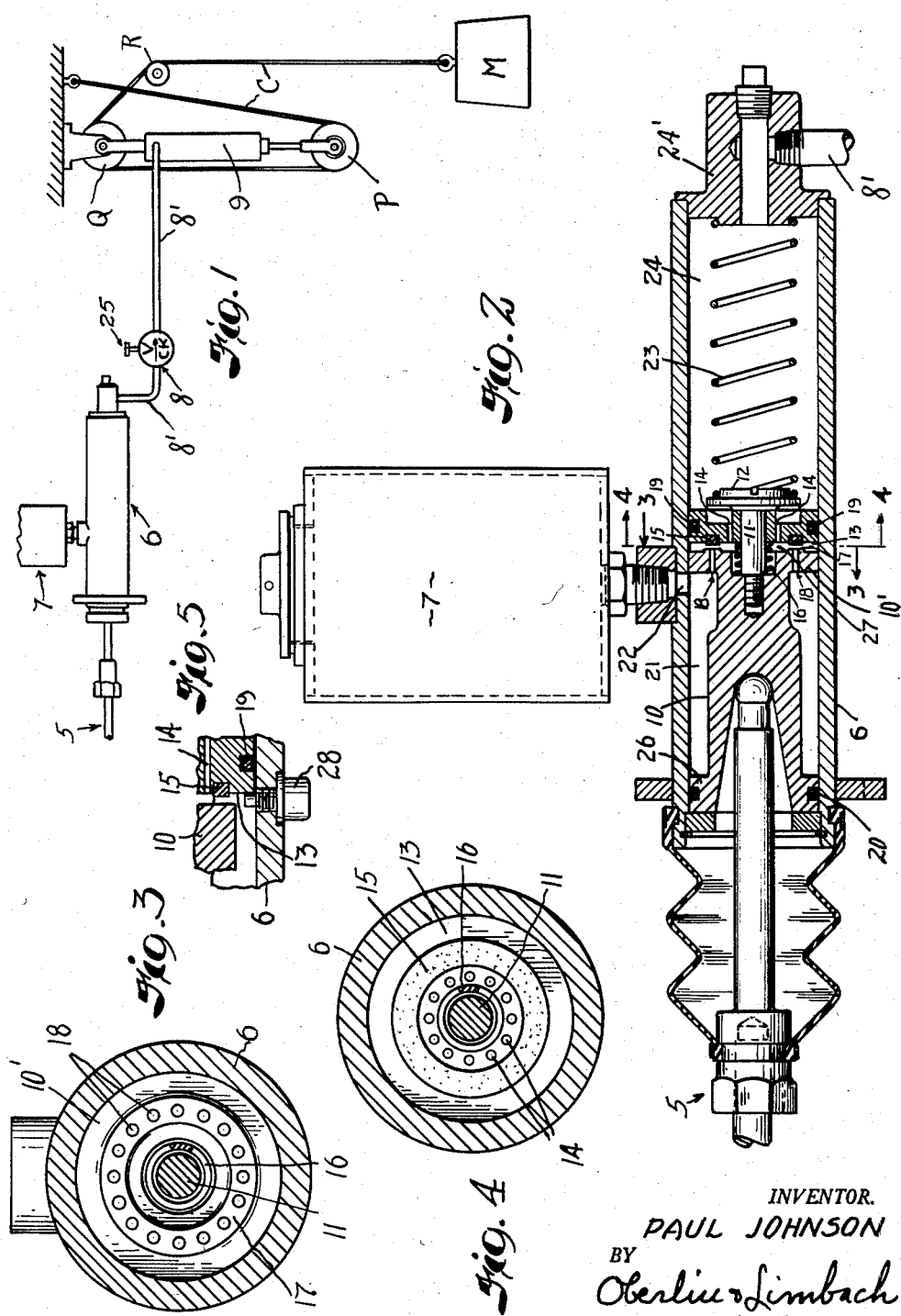
INVENTOR.
PAUL JOHNSON
BY
Oberlin & Limbach
ATTORNEYS.

United States Patent Office 2,847,827
Patented Aug. 19, 1958

2,847,827

HYDRAULIC COMPENSATING MASTER CYLINDER

Paul Johnson, Lorain, Ohio, assignor to The Thew Shovel Company, Lorain, Ohio, a corporation of Ohio Application September 13, 1954, Serial No. 455,540

1 Claim. (Cl. 60—54.6)

The present invention relates to master cylinders used in hydraulic systems to actuate a remote device, which systems include a check valve which normally blocks return flow from the remote device, but which may be opened to permit such return flow.

The operation of master cylinders for hydraulic systems of this type has created two principal problems.

Because systems of this type contain a check valve, means must be provided for the flow of hydraulic fluid past the master cylinder piston when the movable part of the cylinder is being returned to its normal position after a working stroke. In the past, this has been accomplished by using cup-type packing around the piston head. The use of this type of packing does not permit the rapid return of the piston to its normal position, nor does this packing provide as good a seal between the piston and cylinder walls as is possible with other types of packing.

In systems of this type provision must be made for return of the fluid from the remote device to the system reservoir when the check valve is opened. This usually occurs after the piston has returned to its normal position. Also the capacity of the remote device is frequently such that the master cylinder must be actuated several times in order to satisfy the requirements of the remote device. In prior art systems this return flow has been accomplished by providing a small hole in the wall of the master cylinder just in advance of the normal position of the piston. This hole, covered by the piston in the initial stages of its fluid delivery stroke but open when the piston is in its normal position, by suitable conduits associates therewith, provides passage between the system reservoir and the remote device. Such hole has necessarily been small for two reasons. As the size of the hole is increased, the damage done to the packing around the piston when the piston moves over the hole is increased, and as the size of the hole is increased, a greater portion of the working stroke of the piston is used in sealing the hole. The fact that this hole must be small has limited the rate of flow of hydraulic fluid through it and hence increased the time necessary to empty the remote device.

It is the primary object of this invention to provide a new and improved valve arrangement for the master cylinder of this type of hydraulic system.

It is a further object of this invention to eliminate the necessity of providing a hole in the cylinder wall in advance of the normal position of the piston.

It is a further object of the present invention to eliminate the necessity of using cup packing on the piston of the master cylinder.

It is a further object of the invention to provide a valve arrangement for the piston of a hydraulic system as herein described which will permit fluid to pass rapidly through the head of the piston when the movable part of the master cylinder is being returned to its normal position after a working stroke.

It is a further object of this invention to provide a valve arrangement for the head of the piston in a hydraulic system as herein described, such that even when several working strokes of the master cylinder have been required to fill the remote device, and when the movable part of the master cylinder has been returned to its normal position and the check valve has been opened, the entire amount of the fluid in the remote device may be quickly returned to the reservoir of the system.

How the foregoing objects are achieved will appear more fully throughout the following specification which describes one particular construction for a master cylinder embodying the principles of my invention.

In the accompanying drawings:

Fig. 1 is a schematic diagram of a hydraulic system in which the use of my invention would be advantageously employed;

Fig. 2 is a view in longitudinal section of one construction for my invention;

Fig. 3 is a view in cross-section along the plane substantially indicated by the line 3—3 in Fig. 2; and Fig. 4 is a view in cross-section along the plane substantially indicated by the line 4—4 in Fig. 2;

Fig. 5 is a view in longitudinal section of another construction for a master cylinder embodying the principles of my invention, wherein parts similar to those in Fig. 2 are not shown.

Broadly stated, my invention comprises the use in a hydraulic system of the character in which a relatively reciprocable piston and cylinder pump is employed to move a fluid from a reservoir to a remote device through a passage containing a check valve which normally obstructs return flow but which is unsealed to permit such return flow for certain operations of the remote device, of the improvement which comprises the provision of a valve member associated with the piston and adapted when said piston moves in its fluid delivering direction, to seal a passage through the head of the piston, and to unseal said passage when the piston moves in the opposite direction.

In Fig. 1 a master cylinder constructed in accordance with my invention is illustrated for convenience as associated in an environment such that when an actuating lever 5 of a cylinder 6 is operated to force hydraulic fluid from a reservoir 7 having an atmospheric vent through a conduit 8' containing a check valve 8 into a slave cylinder 9, the slave cylinder 9 expands forcing a pulley P downward. As the pulley P moves downward, it draws a cable C over two pulleys Q and R, and the cable C lifts a mass M.

One form of a master cylinder embodying my invention as shown in Fig. 2, may be described as follows:

In a cylinder 6 is a slidably mounted piston stem 10 having front and rear guiding flanges 10' and 26 respectively. Into the front end of the stem 10 there is screw mounted a shaft 11 which carries on its forward end a radial disc 12. On the shaft 11 is slidably mounted an annular piston head 13 which is spring biased by a spring 16 to a position remote from the flange 10'. Extending axially through the piston head 13 concentric with the shaft 11 is a circular row of ports 14, most clearly illustrated in Fig. 4. Extending axially through the flange 10' and concentric with the shaft 11 is a circular row of ports 18 which terminates in a raised annulus 17 as most clearly illustrated in Fig. 3. In an annular groove on the periphery of the piston 13 is mounted an annular packing ring 19. A similar packing ring 20 is mounted in an annular groove on the periphery of the flange 26. A space 21 between the flanges 10' and 26 of the stem 10 is connected to the reservoir 7 by a port 22 in the cylinder wall 6. In the space 24 in the cylinder forwardly of the piston, a compression spring 23 is mounted bearing at one end against the end closure 24' and at its other end against the flange 12.

In operation, when the handle 5 is pushed to the right, the spring 16 yields so that the annulus 17 seats against the packing ring 15 sealing passages 18. This seal and the seal between the packing ring 19 and the cylinder wall 6 insures that other fluid displaced by the further forward movement of the piston will unseat the check valve 8 and flow into the slave cylinder 9. When the force is released from the handle 5, the check valve 8 closes and the spring 23 forces the piston assembly to the left allowing the piston head 13 to slide on the shaft 11 away from the annulus 17 opening the passages 18 there through the flange 17. Then as the piston is pushed back further by the spring 23, hydraulic fluid flows from the reservoir 7 through the port 22, through the space 21, through the ports 18, through the space 27, through the ports 14, and into the space 24 in front of the piston. The procedure may then be repeated until the master cylinder has been operated a sufficient number of times to expand the slave cylinder 9 the desired amount.

Then when it is desired to contract the slave cylinder 9, a handle 25 is pulled opening the check valve 8. The fluid in the slave cylinder 9 then flows back through the check valve 8, through the space 24 in front of the piston, through the ports 14, through the space 27, through the ports 18, through the space 21, and through the port 22 into the reservoir 7.

Another form of a master cylinder embodying the principles of my invention, as shown in Fig. 5, may be described as follows:

The piston head 13 is spring-biased on the shaft 11 to a position remote from the stem 10. In this particular construction the flange 10' of the stem 10 does not extend to the cylinder wall 6, but merely extends radially far enough such that, when the piston head 13 moves against the stem 10, the packing ring 15 will effect a seal between the stem 10 and the piston head 13. In this construction where flange 10' does not extend to the cylinder wall 6, the row of parts 18 is not necessary. Also shown in Fig. 5 is a stop screw 28 so placed in the cylinder wall 6 that, when the piston is in its normal position, the stop screw 28 effects positive release of the valve arrangement associated with the piston.

The above description points out the major aspects of my invention, and shows how my new type of master cylinder is extremely useful in hydraulic systems of the type herein discussed.

My invention eliminates unnecessary wear on the packing around the master cylinder piston, and provides for rapid and efficient operation in hydraulic systems of this type.

Other modes of applying the principle of the invention may be employed, change being made as regards the details described, provided the features stated in any of the following claims or the equivalent of such be employed.

I therefore particularly point out and distinctly claim as my invention:

A hydraulic compensating master cylinder comprising a reservoir for fluid; a cylinder provided with an inlet port between its ends in fluid communication with fluid in said reservoir for flow of fluid from said reservoir into said cylinder and vice-versa and provided with a discharge port at one end through which fluid in said cylinder is adapted to be displaced under pressure; a piston assembly reciprocable in said cylinder; said piston assembly comprising an annular piston head, a piston stem including axially spaced apart flanges at one end and a head at the other end between which flanges said piston head is mounted for limited axial movement, a first spring normally biasing said piston head against one flange, said flanges and said piston head defining a passageway outward of said spring for flow of fluid therethrough when said piston head is in its biased position against said one flange, a pair of packing rings carried by said piston head to make sliding, sealed engagement with the wall of said cylinder between such inlet port and such one end and to make sealed engagement with the other flange to close such passageway when said piston head is moved axially away from said one flange, a packing ring carried by the head of said piston stem to make sliding sealed engagement with the wall of said cylinder between the other end of said cylinder and such inlet port; and a second spring disposed between said one flange and such one end of said cylinder to bias said piston assembly to a position whereat the packing rings on said piston head and on the head of said piston stem are disposed on opposite sides of such inlet port, said piston head, when said piston assembly is moved axially toward such one end of said cylinder, being moved by fluid pressure away from engagement with said one flange to close off such passageway as aforesaid for displacement of fluid in said cylinder through such discharge port, said piston head, upon movement of said piston assembly in the opposite direction under the influence of said second spring, being biased by said first spring against said one flange to open such passageway for flow of fluid from said reservoir through such inlet port and such passageway into the portion of said cylinder between said piston head and such one end of said cylinder.

References Cited in the file of this patent

UNITED STATES PATENTS

| | | |
|---|---|---|
| 2,152,499 | Rasmussen | Mar. 28, 1939 |
| 2,163,874 | Goepfrich | June 27, 1939 |
| 2,211,652 | Gardner | Aug. 13, 1940 |
| 2,374,235 | Roy | Apr. 24, 1945 |
| 2,541,312 | Vogel | Feb. 13, 1951 |
| 2,561,009 | Byers et al. | July 17, 1951 |
| 2,638,748 | Miller | May 19, 1953 |
| 2,649,692 | Stelzer | Aug. 25, 1953 |

FOREIGN PATENTS

| | | |
|---|---|---|
| 636,933 | Great Britain | May 10, 1950 |
| 812,483 | France | Feb. 1, 1937 |